United States Patent
Bialon et al.

(10) Patent No.: US 11,186,264 B2
(45) Date of Patent: Nov. 30, 2021

(54) PNEUMATIC ABS VALVE DEVICE

(71) Applicant: WABCO EUROPE BVBA, Brussels (BE)

(72) Inventors: Rafal Bialon, Olawa (PL); Tomasz Dedich, Wroclaw (PL); Wojciech Iwaniec, Wroclaw (PL)

(73) Assignee: ZF CV Systems Europe BV, Brussels (BE)

( * ) Notice: Subject to any disclaimer, the term of this patent is extended or adjusted under 35 U.S.C. 154(b) by 77 days.

(21) Appl. No.: 16/671,550

(22) Filed: Nov. 1, 2019

(65) Prior Publication Data
US 2021/0129820 A1    May 6, 2021

(51) Int. Cl.
*B60T 15/02* (2006.01)
*B60T 15/52* (2006.01)
*B60T 8/176* (2006.01)
*F16K 31/06* (2006.01)

(52) U.S. Cl.
CPC ............ *B60T 15/027* (2013.01); *B60T 8/176* (2013.01); *B60T 15/52* (2013.01); *B60T 2270/10* (2013.01); *F16K 31/0686* (2013.01)

(58) Field of Classification Search
CPC .................................. B60T 15/027; B60T 15/52
See application file for complete search history.

(56) References Cited

U.S. PATENT DOCUMENTS

| | | | | |
|---|---|---|---|---|
| 3,613,720 A | * | 10/1971 | Welch | F16K 15/144 137/527.8 |
| 4,580,849 A | * | 4/1986 | Farr | B60T 8/5068 303/118.1 |
| 5,118,169 A | * | 6/1992 | Moller | B60T 8/3605 303/118.1 |
| 8,752,579 B2 | * | 6/2014 | Bushman | A61C 1/16 137/527 |

FOREIGN PATENT DOCUMENTS

DE    19744389 A1 *  4/1999  ............ B60T 15/027

* cited by examiner

*Primary Examiner* — Thomas J Williams
(74) *Attorney, Agent, or Firm* — Warner Norcross + Judd LLP

(57) ABSTRACT

A pneumatic ABS valve device for a pneumatic brake system of a vehicle comprises a check valve mechanism for enabling a supply air flow from a supply port to a delivery port and blocking an air flow in the reverse direction. The check valve mechanism comprises a quick release insert disposed in an insert chamber, the quick release insert being placeable in a basic position for providing a chamber passage in the insert chamber enabling the supply air flow. The quick release insert is displaceable by an air pressure difference from the basic position into an activated blocking position, in which the chamber passage is at least diminished with respect to its basic position, in order to block an air flow from the supply port to the delivery port and enabling exhaust air flow.

16 Claims, 3 Drawing Sheets ial vehicle.
PNEUMATIC ABS VALVE DEVICE

FIELD OF THE DISCLOSURE

The invention generally relates to an ABS valve device, and, more specifically, to an ABS valve device for a pneumatic brake system of a vehicle, and in particular a commercial vehicle.

BACKGROUND

In pneumatic brake systems of vehicles in general, an ABS solenoid valve device is provided between a brake line which is pressurised in case of brake action and the pneumatic brake, e. g. a pneumatic brake cylinder. The ABS valve device comprises a supply port and a delivery port, and it is switchable into the following positions and enables the following modes:

First, an open position for a supply mode or brake mode is provided, for transmitting pressurised air from the brake line via its supply port and its delivery port to the pneumatic brake.

In the open position, the brake pressure in the pneumatic brake cylinder can therefore be increased via the brake line, and further it can be released (slow release) via the brake line without any action of the ABS valve. This slow release of the brake pressure is realised via the open ABS valve, the brake line and in general a relay valve connected to the brake line, in particular a control relay valve for pressurising and releasing (bleeding) the brake line.

Further, the ABS solenoid valve in general enables a pressure holding position or pressure holding mode, in which the pressurised brake cylinder is separated from the brake line for holding the brake pressure in the brake cylinder.

Further, ABS valve devices enabling a quick release are known. In the quick release function the ABS valve device provides a connection of its delivery port to an additionally provided quick release outlet (exhaust port) of the ABS valve device, which enables a quicker bleeding of the brake cylinder.

In general these different positions can be realised by e. g. two 2/2 solenoid valves connecting the three ports of the ABS valve device, in particular a first solenoid valve connecting the supply port and the delivery port and a second solenoid valve connecting the delivery port and the quick release outlet. Further, a check valve (non-return valve) is provided between the supply port and the delivery port for blocking a quick pressure release from the delivery port to the supply port; this check valve can be bypassed by a throttle enabling the slow pressure decrease in the open position of the ABS valve device, as mentioned above.

The check valve in general is realised by a spring-biased ball valve, in which a valve ball is pressed by e. g. a metal helical spring onto a valve seat. Therefore the supply pressure provided at the supply port must first overcome the biasing force of the spring in order to open the check valve and afterwards pressurise the connected pneumatic brake cylinder.

However, pressure variations in pneumatic systems with long pneumatic lines often take more time and therefore, the switching of the ABS valve device between its positions can be undesirably impacted.

BRIEF SUMMARY

The subject invention provides a pneumatic ABS valve device which enables quick changes between its positions and a reliable functionality.

The inventive ABS valve device comprises a quick release insert provided in an insert chamber. This quick release insert in particular helps to realize the function of a check valve.

In an open basic position the quick release insert opens a chamber passage inside the insert chamber, thereby enabling the air flow between a supply port and a delivery port. In an activated blocking position, the quick release insert is displaced, thereby closing the chamber passage. The displacement is initiated by a pressure difference acting on faces of the quick release insert; according to specific embodiments, no biasing force or spring force is included, which presses or acts onto the quick release insert.

The displacement is in certain embodiments a swiveling or pivoting motion of the quick release insert. This helps to avoid sticking effects; the pivoting motion can be exemplified by a well-defined angular range.

The open basic position can be secured in particular by action of gravity; this means that the quick release insert falls into its open basic position only by gravity, without a biasing force. Thus sticking effects and aging problems of a spring can be avoided. Further, the return force which brings the quick release insert into its basic position can be dimensioned very small, in particular smaller than any biasing spring forces.

According to specific embodiments the quick release insert is already open in its basic position, i.e. the chamber passage is already free, enabling an air flow between the supply port and the delivery port. Thus—contrary to common check valves—no initial pressure difference is necessary to open a check valve, e. g. pushing a ball from a valve seat against the biasing force of a metallic spring. Thus, the supply of pressurised air can start immediately after supplying pressure at the supply port.

However, the non-return function of a check valve is realized by the quick release insert, since it is displaced by a pressure difference acting in particular from the delivery side thereby closing the chamber passage. Thus only a negligible air flow might pass through the chamber passage until it is closed.

The quick release insert typically comprises rubber at least on its surface; in certain embodiments, the quick release insert is completely made of rubber; thus it has low mass and is reliable. The quick release insert and the insert chamber are typically designed in order to allow only two positions of the quick release insert and thereby preventing any sticking effect of the quick release insert.

In certain embodiments, the insert chamber is provided immediately behind the supply port. Thus, the air blocking is realised directly at the supply port, i. e. not after a solenoid valve. This ensures that the rapid air blocking does not cause resonance effects inside the ABS valve device.

The throttle function can be realized by in particular by an additional bore in the housing.

BRIEF DESCRIPTION OF THE DRAWINGS

The invention is hereinafter explained more in detail with reference to the appended drawings, in which.

DETAILED DESCRIPTION

Figure 3:
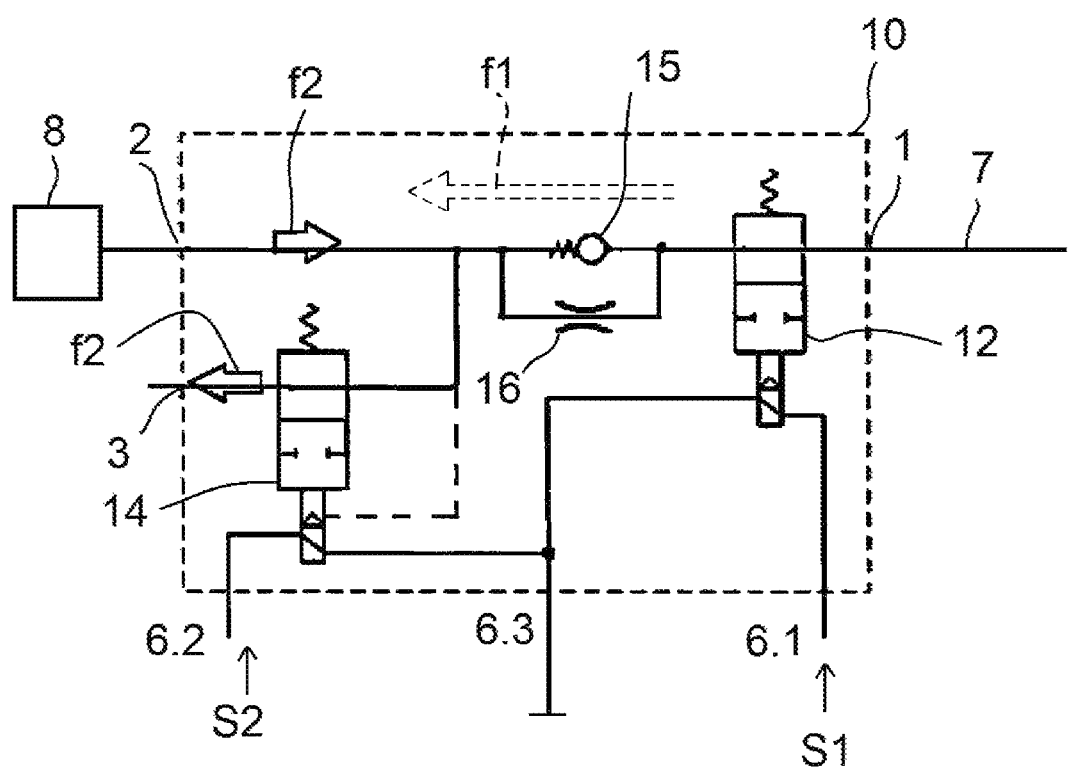
FIG. 3 is a block diagram of an embodiment of a pneumatic ABS solenoid valve device.

The block diagram of FIG. 3 depicts a pneumatic ABS solenoid valve device 10 provided in a pneumatic brake system 9 of e. g. a commercial vehicle. Such a pneumatic ABS solenoid valve 10 as shown in this block diagram is in general known in the art. The pneumatic ABS solenoid valve 10 comprises a supply port 1 for supplying pressurised air, a delivery port 2 for delivering pressurised air to a pneumatic brake 8, in particular a brake cylinder 8, and a quick release outlet (exhaust port) 3 for a quick release or quick exhausting of pressurised air from the brake cylinder 8. According to the block diagram of FIG. 3 the brake cylinder 8 depicted in dashed lines is to be connected to the delivery port 2, and the supply port 1 is to be connected to a pneumatic brake line 7 extending from e. g. a control valve or a pressurised air tank.

The pneumatic ABS solenoid valve device 10 of FIG. 3 further comprises electric control inputs 6.1, 6.2 and 6.3, wherein 6.3 is a ground line input connected to ground, 6.1 is a first control input for receiving a first electric control signal S1 and 6.2 is a second control input for receiving a second electric control signal S2.

A first 2/2 solenoid blocking valve 12 is connected to the supply port 1 and electrically controlled by the first electric signal S1. A check valve (non-return valve) 15 and a throttle 16 are switched in parallel between the first 2/2 solenoid blocking valve 12 and the delivery port 2.

A second 2/2 solenoid blocking valve 14 is switched between the delivery port 2 and the quick release outlet 3, which second blocking valve 14 is controlled by the second electric signal S2.

In their basic position both solenoid blocking valves 12, 14 are open, respectively. Thus in its open position with S1=0 the first blocking valve 12 enables a pressure supply; in its switched position with S1=1 the pressure supply is blocked. The second blocking valve 14 is provided for connecting the delivery port 2 to the quick release outlet 3 in its open position with S2=0, thereby enabling a quick release or quick exhaust of the brake cylinder 8.

Thus in the position of S1=0 and S2=1 the pneumatic ABS solenoid valve device 10 enables a pressure supply from the supply port 1 via the check valve mechanism 15 to the delivery port 2 for actuating the brake cylinder 8.

Further a slow release of pressurized air from the brake 8 is possible in the position of S1=0 and S2=1, i.e. an air flow in the reverse direction, from the delivery port 2 to the supply port 1 via the throttle 16, which is switched parallel to the check valve mechanism 15 and limits this reverse air flow. The brake line 7 can be connected to a control relay valve, which can be switched for pressurizing or venting the brake line 7. Thus the function of pressure supply, i.e. braking action, or slow pressure release is controlled by the external control relay valve connected to the braking line 7, without actuating the valves 12, 14.

The position of S1=1 and S2=1 is provided for the status "pressure holding", as a part of an ABS control process.

The position of S1=1 and S2=0 is provided for the quick release of pressurized air from the brake cylinder 8, the delivery port 2 to the quick release outlet 3, as indicated by the exhaust air flow f2. Thus this quick release is realised within the ABS solenoid valve device 10; this quick release is in particular part of the ABS control process. Thus the brake line 7 is not vented by this quick release function, and a quicker pressure decrease in the brake cylinder 8 can be realised. For bleeding the brake cylinder 8 through the ABS solenoid valve device 10 the air supply from the supply port 1 is cut off by S1=1, i. e. switching the first 2/2 solenoid blocking valve 12 into its blocking position, and S2=0; thus the second 2/2 solenoid blocking valve 14 is in its open basic position, thereby enabling a rapid release of the pressurised air in the brake cylinder 8 from the delivery port 2 through the second 2/2 solenoid blocking valve 14 to the quick release outlet 3.

In the supply mode or braking mode air can flow directly via the open first 2/2 solenoid blocking valve 12 and the checking valve 15, which is open in this direction, to the delivery port 2.

Figure 1:
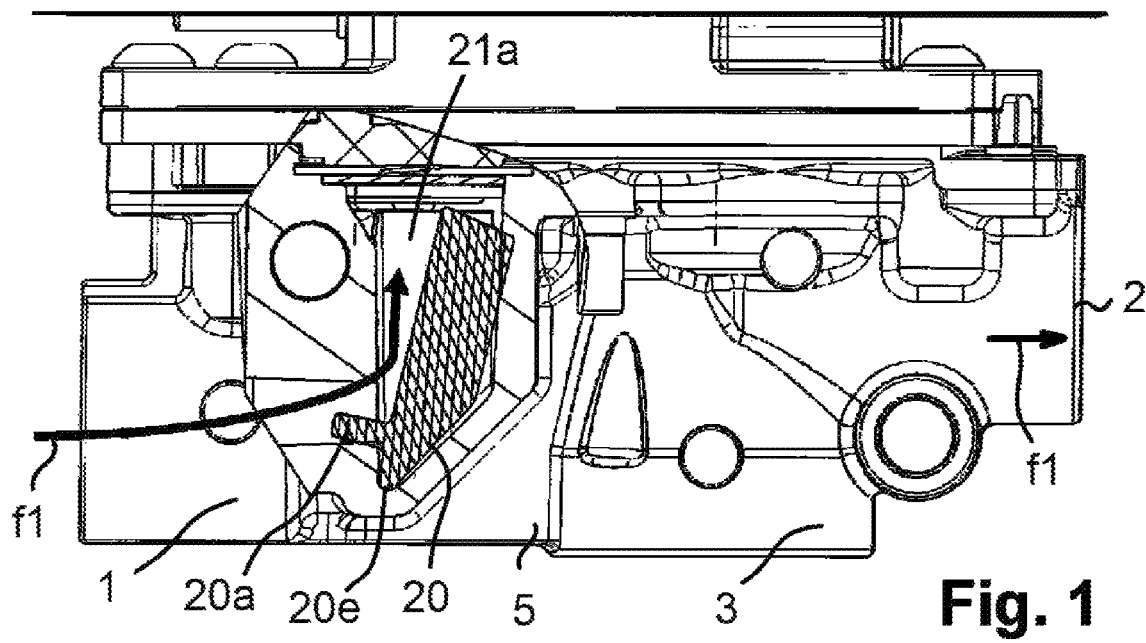
FIG. 1 is a sectional view of a pneumatic ABS solenoid valve device according to an embodiment of the invention, in its open basic position enabling pressure supply from the supply port.
Figure 2:
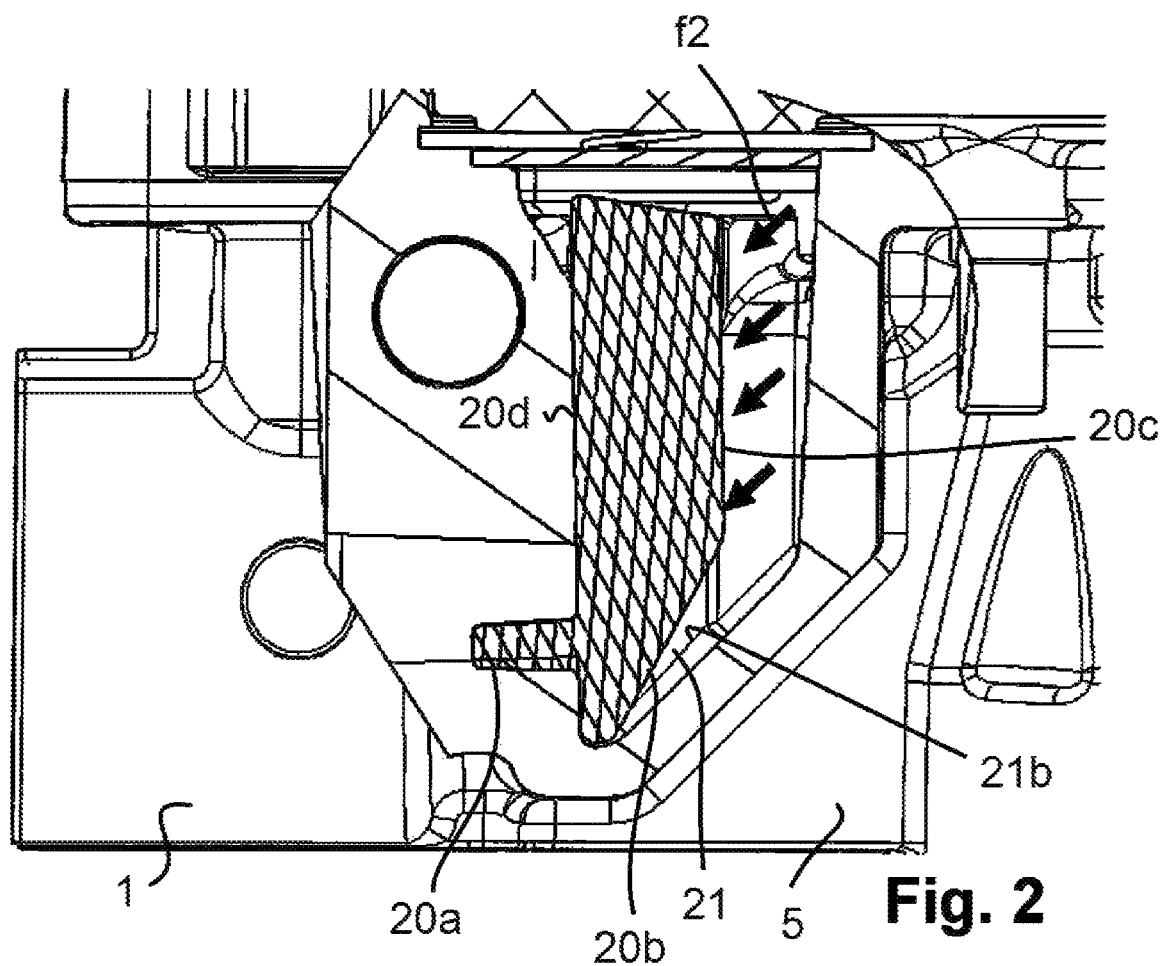
FIG. 2 is an enlarged view of the check valve arrangement of FIG. 1 in the status of pressure release.

FIGS. 1 and 2 describe a first embodiment of the invention, as described hereinafter.

According to the embodiment of FIG. 1, 2 the check valve 15 of FIG. 3 is realized by a quick release insert 20 provided in an insert chamber 21, which insert chamber 21 is provided directly behind the supply port 1. The quick release insert 20 is in certain embodiments made of rubber; the quick release insert 20 and the insert chamber 21 are designed in order to allow only two positions of the quick release insert 20 and preventing any sticking effect of the quick release insert 20:

The insert chamber 21 is provided immediately behind the supply port 1. Thus the air stream and the pressure characteristics inside the casing 5 (housing) define the position of the quick release insert 20, as is described in detail hereinafter:

In the open basic position of FIG. 1 the quick release insert 20 allows a supply flow f1 from the supply port 1 to the delivery port 2, as indicated by dashed lines. In this position the quick release insert 20 is in its first position contacting the insert chamber 21 e. g. on its inclined back stop face 20b. Thus pressurised air supplied via the brake line 7 to the supply port 1 flows through an open chamber passage 21a between a front face 20d and the casing 5, as can be seen from FIG. 1. The quick release insert 20 contacts with its back stop face 20b an inclined or slant supporting face 21b of the casing 5. The quick release insert 20 always falls into this basic position of FIG. 1 by action of gravity, thereby opening the chamber passage 21a, which enables the connection of the supply port 1 to the delivery port 2.

The solenoid blocking valves 12 and 14 are typically positioned in the casing 5 above the insert chamber 21, with direct connection to the insert chamber 21. Thus compared to FIG. 3 the parallel connection of the check valve mechanism 15 and the throttle 1 is positioned directly at the supply port 1, and the solenoid valves 12 and 14 are connected to the other end of the check valve mechanism.

By switching S1=1, the first 2/2 solenoid blocking valve 12 is switched into its blocking position thereby stopping the supply of pressurised air. Thus the air flow from the supply port 1 through the chamber passage 21a stops; if S2=0, the second 2/2 solenoid blocking valve 14 is in its open position thereby enabling a pressure release through the quick release outlet 3. Thus air from the brake cylinder 8 flows back from the delivery port 2 into the pneumatic ABS solenoid valve device 10. This air flow acts onto a back pressure face 20c of the quick release insert 20 thereby tilting the quick release insert 20 into its blocking position of FIG. 2, in which its front face 20d contacts a sealing face 21c of the insert chamber 21 thereby closing the chamber passage 21*a*. The air from the brake cylinder 8 now flows to the quick release outlet 3 thereby releasing the brake cylinder 8.

Thus the air blocking is realised directly at the supply port, i. e. not after a solenoid valve. This ensures, that the rapid air blocking does not cause resonance effects inside the device.

Thus the quick release insert 20 realises the function of at least the check valve 15; however, no spring means, as e. g. a helical metal spring, is provided. The position of the quick release insert 20 is released by the pressure relation, whereas the basic position can be realised by action of gravity, as mentioned above.

The quick release insert 20 further comprises a pilot stick 20*a* in order to avoid any further movements of the quick release insert 20, in particular a rotation of the quick release insert 20 inside the insert chamber 21 over the two positions. Thus only the two positions of FIGS. 1 and 2 are realizable. Thus the pilot stick 20*a* provides the function of a rotation preventing mechanism.

In the supply mode (brake mode, opening condition) of FIG. 1 the supply port 1 is not closed or covered by the quick release insert; this is an import advantage with respect to prior art embodiments, in which a common check valve closes the supply by the action of the metal spring and air can flow through the check valve only after the force enabled by the supply pressure is high enough to move the common check valve from its blocking into its open position. However, according to the invention, the inventive quick release insert 20 is provided in the basic position of FIG. 1, which is already open. Thus no unnecessary movement of the check valve is necessary.

In the closing condition of a common check valve a ball returns to its blocking position by spring force. The additionally acting spring force pushes the ball onto its seat and thereby provides a tight blocking of supply air. However, according to the inventive quick release insert 20, the air flow from the supply port 1 is blocked not by a spring force but by the air pressure difference acting on the faces of the quick release insert 20. Thus the quick release insert 20 returns to its blocking basic position or primary position, if the pressure gradient decreases. Thus the closing can be realized quicker than in the common ball valve solution.

Figure 4:
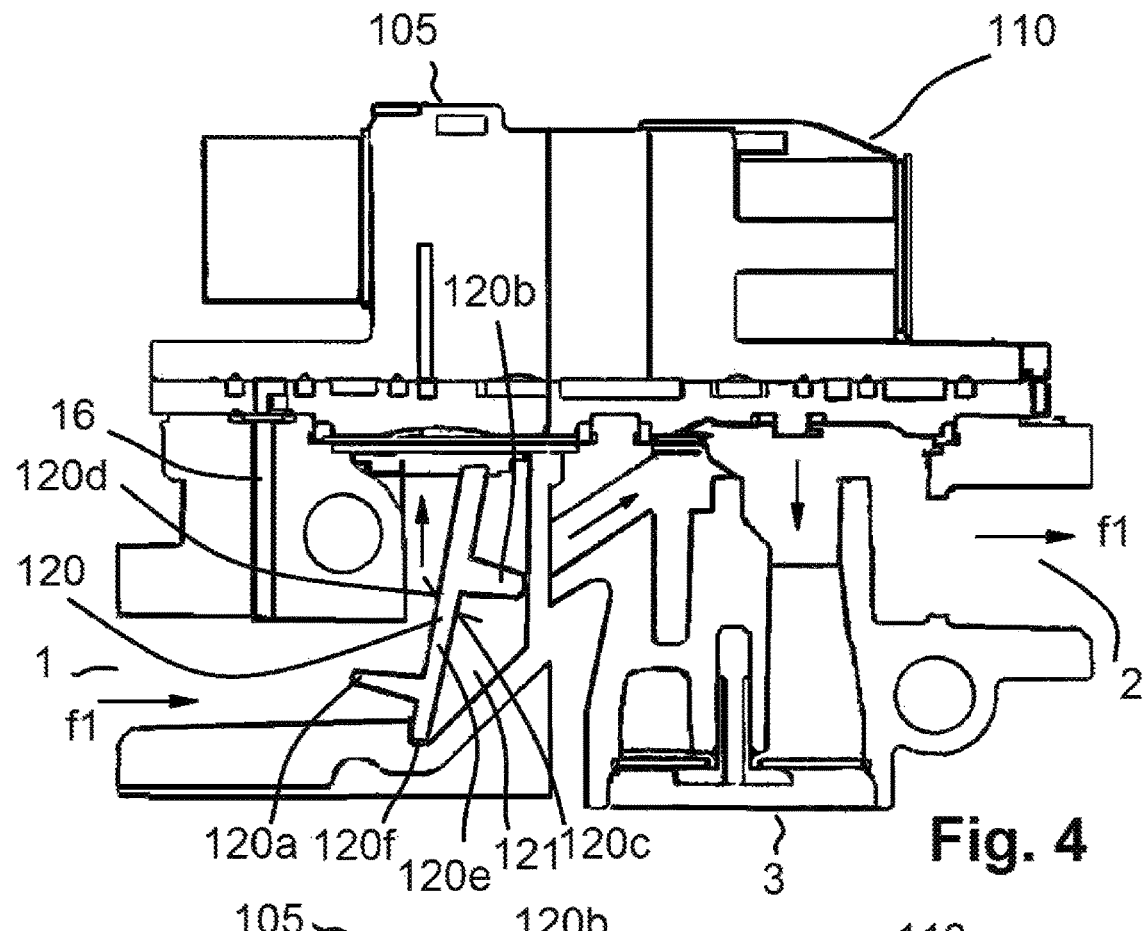
FIG. 4 is a sectional view according to FIG. 1, of a further embodiment, in its open basic position enabling supply of air.
Figure 5:
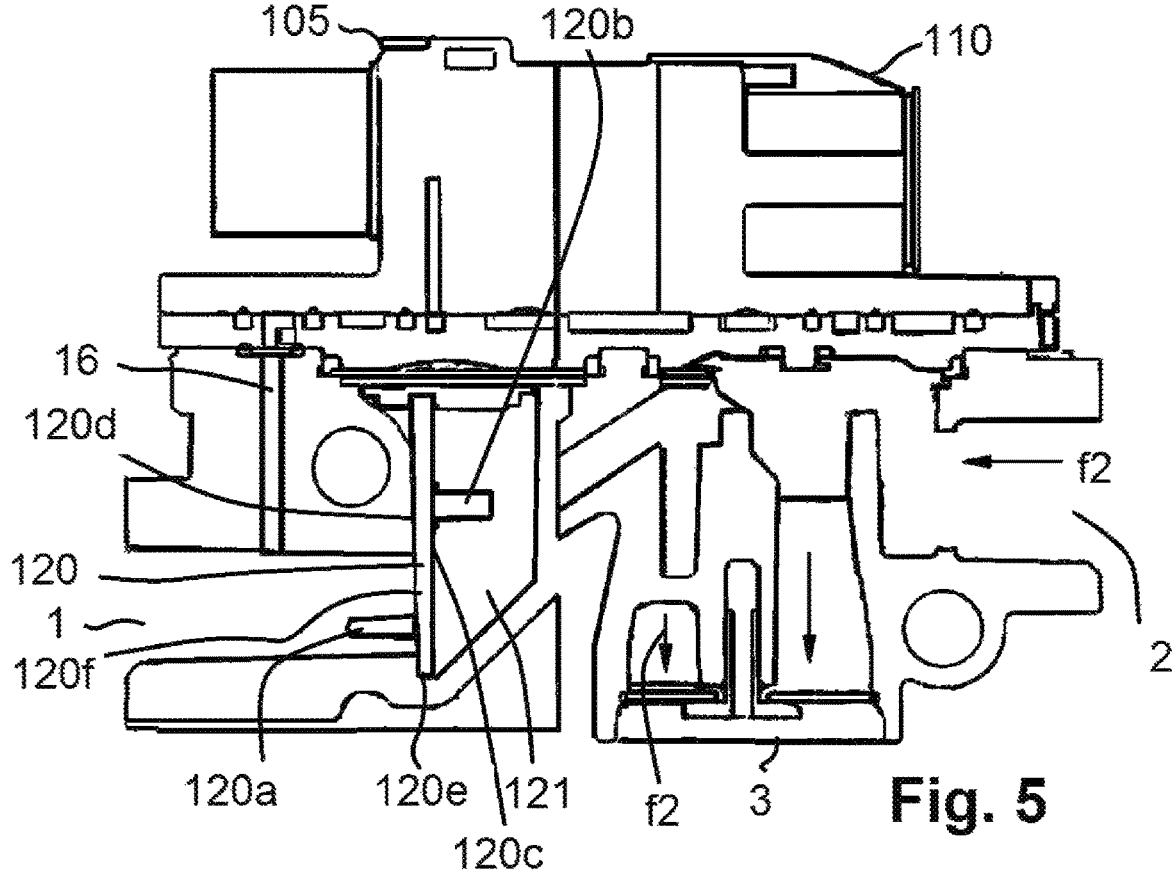
FIG. 5 is an enlarged view of the second embodiment, comparable to FIG. 2.

FIGS. 4 and 5 depict a second embodiment of a pneumatic ABS solenoid valve device 110, in which identical or similar parts with respect to the first embodiment of FIGS. 1 and 2 are marked by identical or similar reference numerals.

In the embodiment of FIGS. 4 and 5 the quick release insert 120 is generally realised by a rubber flap piece comprising a sheet part 120*e*, a pilot stick 120*a* similar to the pilot stick 20*a* of the first embodiment, and a back stop protrusion 20*b* (back stop rod), which extends from the flap part 120*e* backwards, i. e. to the left in FIG. 4. Thus the quick release insert 120 is smaller and comprises less mass than the quick release insert 20 of the first embodiment of FIGS. 1, 2. However, the open basic position of FIG. 4 corresponds to the open basic position of FIG. 1, and the closed position of FIG. 5 corresponds to the closed position of FIG. 2, respectively. Thus the quick release insert 120 always falls by action of gravity into its basic position of FIG. 4, if no pressure action turns it into its activated, closing position of FIG. 5, in which its front face 120*d* contacts the sealing face of the casing 105 of the valve assembly. According to FIG. 4 a supply air flow f1 supplied to the supply port 1 is flowing through the chamber passage 121*a* (corresponding to the chamber passage 21*a*) to the supply port 2.

In the quick release mode the quick release insert 120 is braking the air flow from the supply port 1 and air from the delivery port 2 and the connected brake cylinder 8 flows with a maximum air flow into the delivery port 2 and through an exhaust channel to the quick release outlet 3. The quick release insert is pressed into its closing condition by the air pressure acting on its back face, thereby tilting the quick release insert 120 and closing the chamber passage 121*a*.

Thus the air blocking is realised directly at the supply port 1; the rapid air block does not cause any resonance in internal parts, in particular at a diaphragm.

According to these embodiment the quick release insert 20, 120 provides an air tightness of supply air only during the time of a sufficient pressured difference acting on its faces. The air tightness is not provided for a longer time, in particular not in a static condition, as it is known from common ball check valves. Thus the inventive quick release insert 20, 120 provides a short-time tightness or short-time check valve behaviour. The inventive pneumatic valve device 10, 110 is open from the beginning, without a spring-biased closing condition of the check valve; the chamber passage 21*a*, 121*a* does enables an immediate air flow of supply air for initialising a brake action in the brake cylinder 8.

According to the inventive quick release insert no biasing spring force is necessary, and in particular no such spring force is provided, unlike the common spring-bias of a valve ball pressed onto its valve seat. The quick release insert 20, 120 is switched into its positions by the air flow and the pressure difference.

The closing condition is realised in a similar manner according to the common check valve and inventive valve assembly: the supply air pressure is lower than the delivery air pressure, sent the pressure before the actuator is lower than the pressure behind the actuator.

A return into the basic condition is realised in the common check valve by the spring force; according to invention the quick release insert, 20, 120 returns into its basic position by gravity, i. e. falls into its basic position of FIG. 1 or FIG. 4.

The tightness is realised in the common check valve by the spring force, which secures the closing of the air flow. According to the inventive valve assembly, the closing of the air flow provided by the pressure difference acting on the front faces and back faces of the quick release insert 20, 120.

The function of the throttle 16 of FIG. 3 can be realized in particular by an additional bore in the housing 5, 105, as is depicted in FIGS. 4 and 5. According to a further embodiment, the sealing of the front face 20*d*, 120*d* may be incomplete in order to realize this throttle function.

Further exemplary embodiments are described below.

Embodiment 1 is a pneumatic ABS valve device (10, 110) for a pneumatic brake system (9) of a vehicle, in particular commercial vehicle, the pneumatic ABS valve device (10, 110) comprising:

a supply port (1) for supplying pressurised air;

a delivery port (2) for delivering pressurised air to a pneumatic brake (8), a quick release outlet (3) for a quick release of pressurised air by an exhaust air flow (f2) from said delivery port (2), a casing (5, 105), and a check valve means (15; 20, 120) for enabling an supply air flow from said supply port (1) to said delivery port (2) and blocking an air flow in the reverse direction;

characterised in that said check valve means (15; 20, 120) comprises a quick release insert (20, 120) provided in an insert chamber (21, 121), said quick release insert (20, 120) is placeable in a basic position for providing a chamber passage (21a, 121a) in said insert chamber (21, 121) enabling said supply air flow, and said quick release insert (20, 120) is displaceable by an air pressure difference from said basic position into an activated blocking position, in which said chamber passage (21a, 121a) is at least diminished with respect to its basic position, in order to block an air flow from said supply port (1) to said delivery port (2) and enabling said exhaust air flow (f2).

Embodiment 2 is based on Embodiment 1 and is characterised in that said quick release insert (20, 120) comprises a first face, in particular front face (20d, 120d), for contacting a sealing face (21c, 121c) of said insert chamber (21, 121) in said activated blocking position thereby closing said chamber passage (21a, 121a) at least partially, and said quick release insert (20, 120) further comprising a back stop (20b, 120b) for contacting a blocking chamber face (21b, 121b), in particular back face (21b, 121b) of said insert chamber (21, 121) in said basic position.

Embodiment 3 is based on Embodiment 2 and is characterised in that said back stop (20b, 120b) is realised as a back stop face (20b) or a protrusion (120b) said quick release insert (20, 120), extending into a backward direction.

Embodiment 4 is based on any one of Embodiments 1-3, and is characterised in that said quick release insert (20, 120) comprises a sealing surface material, in particular a rubber or plastic material on at least its first face (20d, 120d).

Embodiment 5 is based on Embodiment 4 and is characterised in that said quick release insert is made of rubber material or plastic material.

Embodiment 6 is based on any one of Embodiments 1-5, and is characterised in that said quick release insert (20, 120) is rigid and non-flexible, in that it is not deformed between its basic position and its activated position.

Embodiment 7 is based on any one of Embodiments 1-6, and is characterised in that said quick release insert (20, 120) is pivotably or swiftably provided in said insert chamber (21, 121) for pivoting or swifting between its open basic position and its activated blocking position.

Embodiment 8 is based on Embodiment 7 and is characterised in that said quick release insert (20, 120) is supported on its bottom end (20d, 120d) in said insert chamber (21, 121) and pivots with its top end between said two positions, wherein said pivoting motion is stopped by its first face (20d, 120d) and its back stop (20b, 120b) in said positions, respectively.

Embodiment 9 is based on any one of Embodiments 1-8, and is characterised in that said quick release insert (20, 120) comprises rotation preventing means (20a, 120a) for allowing only a displacement between its two positions and preventing a displacement or rotation of said quick release insert (20, 120) into further positions, wherein said rotation preventing means (20a, 120a) are in particular provided without a contact on said casing (5, 105) in said allowable two positions, e.g. as a pilot stick (20a, 120a).

Embodiment 10 is based on any one of Embodiments 1-9, and is characterised in that it further comprises at least one solenoid valve (12, 14), in particular two blocking solenoid valves (12, 14) for switching it into at least the following positions:

a supply position or brake position for enabling a pressure supply of pressurised air from said supply port (1) to said delivery port (2) and blocking said quick release outlet (3), a pressure holding position for blocking said supply port (1) and said quick release outlet (3), and a quick release position for connecting said delivery port (2) to said quick release outlet (3).

Embodiment 11 is based on Embodiment 10 and is characterised in that a throttle (16), in particular a channel or a bore, is provided in parallel to said check valve means (15) or as part of said check valve means (15).

Embodiment 12 is based on any one of Embodiments 1-11, and is characterised in that said insert chamber (21, 121) is provided in said casing (5, 105), preferably connected to said supply port (1).

Embodiment 13 is based on any one of Embodiments 1-12, and is characterised in that said quick release insert (20, 120) is provided without a biasing force, in particular without a spring bias for biasing it into its open basic position.

Embodiment 14 is based on Embodiment 13 and is characterised in that in said basic position said quick release insert (20, 120) is provided in a tilted position, wherein its gravity force is acting on it into for acting it into its open basic position.

Embodiment 15 is based on any one of Embodiments 1-14, and is characterised in that said insert chamber (21, 121) and said quick release insert (20, 120) are positioned directly at the supply port, in particular before any switchable valves (12, 14), in order to avoid resonance vibrations of said quick release insert (20, 120).

Embodiment 16 is a pneumatic brake system (9) for a vehicle, in particular a commercial vehicle, said pneumatic brake system (9) comprising:

a pneumatic ABS valve device (10, 110) according to one of Embodiments 1-15, a pneumatic brake (8), in particular a brake cylinder (8), connected to said delivery port (2) of said pneumatic ABS valve device (10, 110), and a pneumatic brake line (7) connected to said supply port (1), for supplying pressurised air.

LIST OF REFERENCE NUMERALS

1 supply port
2 delivery port
3 quick release outlet (exhaust port)
5 casing (housing)
6.1 first control input for electric control signal S1
6.2 second control input for electric control signal S2
6.3 ground line input, neutral input
7 brake line, e.g. extending from a relay control valve to the supply port 1
8 pneumatic brake, e.g. brake cylinder
9 pneumatic brake system
10 pneumatic ABS solenoid valve device
12 first 2/2 solenoid blocking valve
14 second 2/2 solenoid blocking valve
15 check valve, non-return valve
16 throttle
20 quick release insert
20a pilot stick of the quick release insert 20, as a securing means or rotation preventing means,
20b backstop of the quick release insert 20, for a defined basic position 20c back pressure face of the quick release insert 20, for receiving pressure
20d front face of the quick release insert 20, for sealing in the blocking position
20e supporting end of the quick release insert 20, for a support or pivoting axis
21 insert chamber housing the quick release insert 20
21a chamber passage of the insert chamber 21
21b supporting face of the insert chamber 21
21c sealing face of the insert chamber 21
105 casing (housing) of FIG. 4, 5
110 pneumatic ABS solenoid valve device of FIG. 4, 5
120 quick release insert of FIG. 4, 5
120a pilot stick of the quick release insert 120, as a securing means or rotation preventing means,
120b backstop (bumper) of the quick release insert 120, for a defined basic position
120c back pressure face of the quick release insert 120, for receiving pressure
120d front face of the quick release insert 120, for sealing in the blocking position
120e supporting end of the quick release insert 20, for a support or pivoting axis
121 insert chamber housing the quick release insert 120
121a chamber passage of the insert chamber 121
121b supporting face of the insert chamber 121
121c sealing face of the insert chamber 121
S1 first electric control signal
S2 second electric control signal
f1 supply air flow from the supply port 1 to the delivery port 2
f2 exhaust air flow from the delivery port 2 to the quick release outlet 3

The terms "comprising" or "comprise" are used herein in their broadest sense to mean and encompass the notions of "including," "include," "consist(ing) essentially of," and "consist(ing) of". The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A pneumatic ABS valve device for a pneumatic brake system of a vehicle, said pneumatic ABS valve device comprising:
   a supply port for supplying pressurised air;
   a delivery port for delivering pressurised air to a pneumatic brake;
   a quick release outlet for a quick release of pressurised air by an exhaust air flow from said delivery port;
   a casing; and
   a check valve mechanism for enabling a supply air flow from said supply port to said delivery port and blocking an air flow in the reverse direction;
   wherein said check valve mechanism comprises a quick release insert disposed in an insert chamber,
   wherein said quick release insert is placeable in a basic position for providing a chamber passage in said insert chamber for enabling said supply air flow,
   wherein said quick release insert is displaceable by an air pressure difference from said basic position into an activated blocking position, in which said chamber passage is at least diminished with respect to the basic position, in order to block an air flow from said supply port to said delivery port and enabling the exhaust air flow, and
   wherein said quick release insert comprises a rotation preventing mechanism for allowing only a displacement between the basic and activated blocking positions and preventing a displacement or rotation of said quick release insert into further positions, wherein said rotation preventing mechanism is without a contact on said casing in the basic and activated blocking positions.

2. The pneumatic ABS valve device according to claim 1, wherein said quick release insert comprises a first face for contacting a sealing face of said insert chamber in the activated blocking position, thereby closing said chamber passage at least partially, and
   wherein said quick release insert further comprises a back stop for contacting a blocking chamber face of said insert chamber in the basic position.

3. The pneumatic ABS valve device according to claim 2, wherein said back stop is further defined as a back stop face or a protrusion of said quick release insert, extending into a backward direction.

4. The pneumatic ABS valve device according to claim 1, wherein said quick release insert comprises a sealing surface material on at least its first face.

5. The pneumatic ABS valve device according to claim 4, wherein said quick release insert comprises a rubber material or plastic material.

6. The pneumatic ABS valve device according to claim 1, wherein said quick release insert is rigid and non-flexible and configured to be not deformed between its basic position and its activated blocking position.

7. The pneumatic ABS valve device according to claim 1, wherein said quick release insert is pivotably or swiftably disposed in said insert chamber for pivoting or swifting between its basic position and its activated blocking position.

8. The pneumatic ABS valve device according to claim 7, wherein said quick release insert is supported on its bottom end in said insert chamber and pivots with its top end between the basic and activated blocking positions, and
wherein the pivoting motion is stopped by the first face and its back stop in the basic and activated blocking positions, respectively.

9. The pneumatic ABS valve device according to claim 1, further comprising at least one solenoid valve for switching into at least the following positions:
a supply position or brake position for enabling a pressure supply of pressurised air from said supply port to said delivery port and blocking said quick release outlet,
a pressure holding position for blocking said supply port and said quick release outlet, and
a quick release position for connecting said delivery port to said quick release outlet.

10. The pneumatic ABS valve device according to claim 1, further comprising a throttle in parallel to said check valve mechanism or as part of said check valve mechanism.

11. The pneumatic ABS valve device according to claim 1, wherein said insert chamber is provided in said casing.

12. The pneumatic ABS valve device according to claim 1, wherein said quick release insert is provided without a biasing force for biasing it into its basic position.

13. The pneumatic ABS valve device according to claim 12, wherein in the basic position said quick release insert is provided in a tilted position, wherein a gravity force is acting said quick release insert into the basic position.

14. The pneumatic ABS valve device according to claim 1, wherein said insert chamber and said quick release insert are positioned directly at the supply port, in order to avoid resonance vibrations of said quick release insert.

15. A pneumatic brake system for a vehicle, said pneumatic brake system comprising:
a pneumatic ABS valve device according to claim 1,
a pneumatic brake connected to said delivery port of said pneumatic ABS valve device, and
a pneumatic brake line connected to said supply port for supplying pressurised air.

16. A vehicle comprising the pneumatic brake system of claim 15.

* * * * *